United States Patent [19]
Surot

[11] Patent Number: 5,810,436
[45] Date of Patent: Sep. 22, 1998

[54] CHILD SEAT WITH A TILTABLE BACK

[75] Inventor: Patrick Surot, Cholet, France

[73] Assignee: Ampafrance S.A., Cholet, France

[21] Appl. No.: 883,767

[22] Filed: Jun. 27, 1997

[30] Foreign Application Priority Data

Jun. 28, 1996 [FR] France .................................. 96 08132

[51] Int. Cl.⁶ ........................................................ A47C 1/08
[52] U.S. Cl. ................................... 297/256.13; 297/284.9
[58] Field of Search ............................ 297/250.1, 256.1, 297/256.13, 284.1, 284.9, 452.33, 452.34, 325, 326, 327, 328, 329, 411.37

[56] References Cited

U.S. PATENT DOCUMENTS

| | | | |
|---|---|---|---|
| 185,247 | 12/1876 | Manier | 297/327 |
| 4,790,593 | 12/1988 | Davalos et al. . | |
| 5,098,157 | 3/1992 | Surot . | |
| 5,286,085 | 2/1994 | Minami | 297/250.1 |
| 5,645,317 | 7/1997 | Onishi et al. . | |

FOREIGN PATENT DOCUMENTS

| | | | |
|---|---|---|---|
| A1-0431199 | 6/1991 | European Pat. Off. . | |
| 691602 | 10/1930 | France | 297/328 |
| A1-2 553 985 | 5/1985 | France . | |
| 450958 | 9/1926 | Germany | 297/327 |
| A1-26 50 182 | 5/1978 | Germany . | |
| A-2 287 876 | 10/1995 | United Kingdom . | |
| WO 86/03673 | 7/1986 | WIPO | 297/328 |

Primary Examiner—Milton Nelson, Jr.
Attorney, Agent, or Firm—Pennie & Edmonds LLP

[57] ABSTRACT

A child seat, to be placed on and fastened to an automobile seat, comprising a bucket, equipped with a sitting part, a back part, a reinforcement supporting the bucket, and a tilting mechanism for the bucket, is provided. The tilt of the bucket can be modified by rotating a screw cooperating with a nut mounted in a rocking manner on the reinforcement. Optionally, the sitting part comprises a sliding portion, of which the displacement from front to rear is caused by the rotation of the screw in conjunction with an auxiliary screw in such a way that the dimension of the sitting part is increased when the bucket is tilted to a greater extent. In addition, the child seat may incorporate armrests which pivot towards or away from each other, thereby decreasing or increasing the width of the child seat.

13 Claims, 6 Drawing Sheets

CHILD SEAT WITH A TILTABLE BACK

TECHNICAL FIELD

This invention relates to a child seat with a tiltable back to be placed on and fastened to an automobile seat. More particularly, the invention relates to a child seat comprising a bucket, equipped with a sitting part and a back part, and a base supporting the bucket, and having a tilting mechanism for the bucket. In addition, this invention relates to a child seat, wherein armrests mounted on either side of the bucket, pivot so as to increase or decrease the width of the child seat.

SUMMARY OF THE INVENTION

The object of the present invention is a child seat comprising a bucket, equipped with a sitting part and with a back part, and a base supporting the bucket and intended to be placed on and fastened to an automobile seat.

It is known that child seats intended for automobiles are designed to ensure maximum protection in the event of an accident, this being achieved under the best possible conditions of comfort. The object of the present invention is such a child seat which has means which allow the entire bucket, in which the child is accommodated, to be tilted in a simple way, so as to make it possible to put the child into the most stretched-out rest position possible. The bucket may thus occupy a first position, in which the back part is substantially vertical, and may be displaced into a second position, in which the back part is tilted.

Another object of the invention is such a seat which makes it possible to tilt the bucket progressively and to keep the bucket in any intermediate position.

Yet another object of the invention, in a variant, is to provide, at the same time as the tilting of the bucket, means which make it possible to elongate the sitting part of the seat and, if appropriate, to increase the angle between the sitting part and the back, so as further to improve the child's comfort in the stretched-out position.

Finally, in a third variant, yet another object of the invention is also to make it possible to modify the width of the bucket independently of or as a function of the tilting of the latter.

According to the invention, the child seat comprises a bucket, equipped with a sitting part and with a back part, and a base supporting the bucket and intended to be placed on and fastened to an automobile seat. The tilt of the bucket may be modified with the aid of a control means which is capable of raising or lowering the front of the sitting part relative to the reinforcement and with the aid of a holding means allowing the back part to slide relative to the reinforcement.

The control means comprises preferably a screw/nut device, mounted between the lower face of the sitting part and the base, and a control member, mounted on the front of the sitting part, so as to be capable of placing and keeping the bucket in any intermediate position.

The screw/nut device may comprise, for example, a main screw, preferably of fast pitch, mounted, for the purpose of its rotation, between a bearing fixed to the lower face of the sitting part and a bearing fixed to an inclined portion of the front of the sitting part, and a main nut mounted in a rocking manner on the base.

The holding means comprises preferably two slideways integral with the back part and cooperating with a cross-member of the base.

In an advantageous variant of the child seat according to the invention, the sitting part comprises a sliding portion, of which the displacement from front to rear is caused by the control means, in such a way that the dimension of the sitting part is increased when the bucket is tilted to a greater extent. The child's comfort is thereby increased in the tilted stretched-out position.

For this purpose, an auxiliary screw/nut device is advantageously mounted under the sitting part, so as to drive the sliding portion of the sitting part.

Such an auxiliary screw/nut device may comprise, for example, an auxiliary screw mounted, for the purpose of its rotation, between a bearing fixed to the lower face of the sitting part and a bearing fixed to the inclined portion of the front of the sitting part, the auxiliary screw being parallel to the main screw and being driven in rotation by the latter. A nut is mounted on the sliding portion of the sitting part and cooperates with the auxiliary screw.

According to one embodiment, a toothed pinion is mounted at the end of the main screw, so as to mesh with a gearwheel mounted at the end of the auxiliary screw. The pinion and the gearwheel may be mounted in the vicinity of the bearings fixed to the lower face of the sitting part.

The auxiliary screw is generally mounted above the main screw between the latter and the sitting part.

In a preferred embodiment, a lumbar support portion is articulated on the sliding portion of the sitting part, so as to increase the angle between the sitting part and the back during the forward displacement of the sliding portion of the sitting part. An improvement in comfort in the most elongated position of the child seat is thus obtained.

According to another advantageous variant of the invention, the seat comprises, furthermore, two lateral frame elements mounted respectively on either side of the bucket on upper and lower axles fixed to the bucket and arranged in a vertical plane. The two lateral frame elements define two armrest reinforcements pivoting between a position in which they are moved closer to one another and a position in which they are moved away from one another. The pivoting of the two lateral frame elements is preferably controlled simultaneously by means of a single auxiliary control member mounted on the front of the sitting part.

This auxiliary control member is advantageously mounted coaxially relative to the abovementioned main screw and acts, for example, on a rotary plate connected to two control rods, themselves connected to the two lateral frame elements.

DESCRIPTION OF THE DRAWINGS

The invention will be understood better from the study of a particular embodiment described by way of non-limiting example and illustrated by the accompanying figures in which.

DESCRIPTION OF THE PREFERRED EMBODIMENTS

Figure 1:
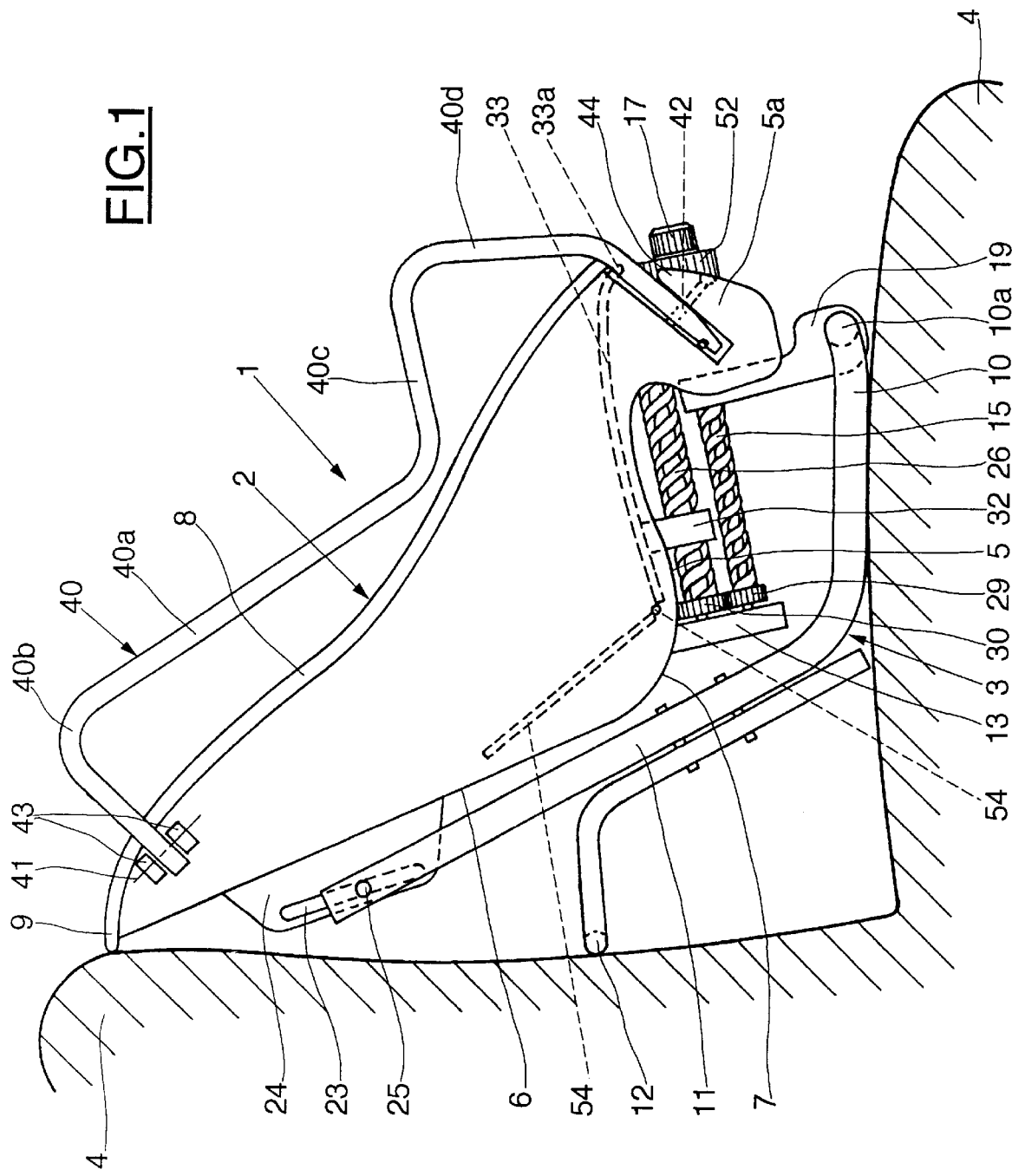
FIG. 1 is a side elevation view of a child seat according to FIG. 1, the present invention in the position tilted to the least extent.

As illustrated in the figures, the child seat, designated as a whole by 1, comprises a part molded from plastic, forming a bucket 2, and a base, produced here in the form of a tubular metal reinforcement 3 supporting the bucket 2 and constituting a support intended to be placed on and fastened to the vehicle seat 4 illustrated diagrammatically. The child seat 1 is secured to the vehicle seat 4 in the conventional way, not illustrated in the drawings, by means of straps or preferably directly by the expedient of the automobile safety belt which cooperates with the reinforcement 3 for the purpose of this fastening.

The bucket 2 comprises a sitting part 5 (FIG. 4) which is substantially horizontal in the position tilted to the least extent, illustrated in FIG. 1. The bucket 2 also comprises a back part 6 which can be seen in FIG. 4 and which, in the position tilted to the least extent, illustrated in FIG. 1, is substantially vertical, but with a slight rearward tilt in order to improve the child's comfort. The sitting part 5 and the back part 6 are joined to one another by means of a curved lower portion 7. The bucket 2 is completed by lateral portions 8 which extend from the upper part 9 of the bucket 2, said upper part performing the function of a headrest, as far as its lower part, where it meets the front part 5a of the sitting part, the said front part performing the function of a support for the child's legs or feet. As may be seen in the figures, the assembly thus formed has the general shape of a bucket, thereby ensuring the child's comfort. The bucket made of molded plastic is, of course, lined with suitable upholstery which is not illustrated in the figures.

The tubular reinforcement 3 comprises a lower framework 10 located under the sitting part 5 and intended to be placed on the automobile seat 4. The lower framework 10 is extended upward in the form of a rear framework 11 which receives, furthermore, a transverse spacing bar 12 having a U-shaped design and fixed to the rear framework 11. The entire tubular reinforcement 3 thus formed may be placed on the vehicle seat 4, the spacing bar 12 coming to bear on the back of the seat 4. The child seat 1 is then suitably installed on the vehicle seat 4, the bucket 2 being supported by the rigid reinforcement 3.

Figure 3:
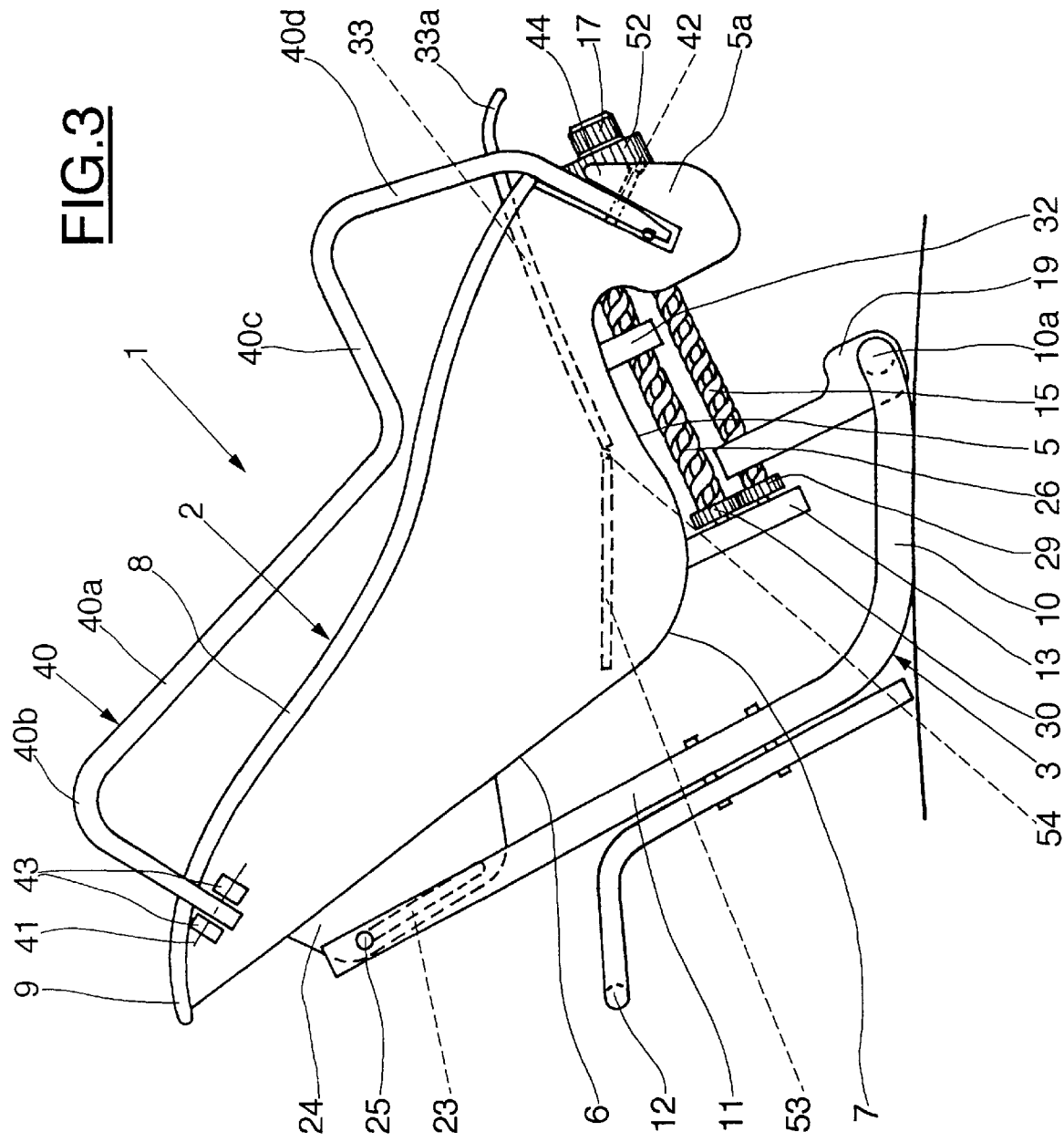
FIG. 3 is a view similar to that of FIG. 1, showing the same seat in the position tilted to the greatest extent.

According to the present invention, the bucket 2 may be tilted between a position which is tilted to the least extent, illustrated in FIG. 1, and a more tilted position, illustrated in FIG. 3, all intermediate positions likewise being possible. For this purpose, the lower face of the sitting part 5 has a support piece 13 extending downward, fixed to the bucket 2 and comprising a bearing 14 capable of receiving a main screw 15 of fast pitch. The other end of the screw 15 passes through a passage 16 made in the front part 5a of the sitting part and comprises a wheel 17 which can be driven manually in rotation. It will therefore be appreciated, in this assembly, that the passage 16 performs as it were the function of a bearing for the main screw 15.

The screw 15 is preferably produced from plastic. It cooperates with an internally threaded portion performing the function of a main nut 18 forming part of a lug 19 mounted on the front crossmember 10a of the lower framework 10 of the reinforcement 3, so as to be capable of rocking through an angle of low amplitude relative to the crossmember 10a. For this purpose, as seen particularly in FIG. 6, a sleeve 20 grips the crossmember 10a between two stops 21, the sleeve 20 being clamped slightly on the crossmember 10a, so as, as has just been said, to allow low-amplitude rocking of the lug 19 fixed to the sleeve 20 by means of the screws 21.

The back part 6 of the bucket 2 has, in its upper portion and on each side, a slot 23 which, in the example illustrated, is made on a rearwardly projecting lug, designated by 24, which is molded integrally with the bucket 2. A crossmember 25 of the reinforcement 3 can pass through the two slots 23 which thus form slideways during the tilting movement of the bucket 2.

In order to modify the tilt of the bucket 2, for example from the position illustrated in FIG. 1, it is sufficient to act on the wheel 17 by rotating the latter, for example in the counterclockwise direction. The rotation of the fast-pitch screw 15 causes said screw to be displaced relative to the nut 18 of the lug 19. This movement causes the front of the sitting part 5 to be raised relative to the lower framework 10 of the reinforcement, said lower framework remaining immobile on the vehicle seat 4. It will be appreciated that, during this movement, the lug 19 rocks slightly relative to the lower crossmember 10a by virtue of the sleeve 20, as mentioned above.

Simultaneously, the upper portion of the back part 6 slides relative to the rear framework 11 of the reinforcement 3, the slideways 23 descending relative to the crossmember 25 which constitutes a means for holding the upper portion of the back part 6, but allowing said upper portion to slide relative to the reinforcement 3.

All the tilted positions, starting from that shown in FIG. 1 and as far as that illustrated in FIG. 3, may be adopted and held as a result of the friction of the screw 15/nut 18 device.

By virtue of the structure of the means used in this example according to the invention, it is therefore possible easily to obtain any tilt of the bucket 2 of the child seat 1 which, moreover, remains suitably placed on and fastened to the vehicle seat 4 by means of the rigid reinforcement 3.

The embodiment illustrated in the figures also provides an additional optional arrangement making it possible to increase the dimension of the sitting part and the angle between the sitting part and the back of the seat as a function of its tilt.

For this purpose, the seat 1 illustrated in the figures comprises an auxiliary screw 26 mounted above the main screw 15, in parallel with this, between the latter and the sitting part 5. The auxiliary screw 26 is supported at one of its ends by a bearing 27 which forms part of the support piece 13. The auxiliary screw 26 is supported at its other end by a bearing 28 fixed to the front part 5a of the sitting part 5. The auxiliary screw 26 is driven in rotation by a geartrain which comprises a pinion 29, fixed to the main screw 15, and a gearwheel 30 fixed to the auxiliary screw 26, the assembly as a whole being mounted in the vicinity of the support piece 13.

The auxiliary screw 26 cooperates with a nut 31 made on a drive lug 32 fastened under a sliding plate 33 located above the sitting part 5. The sitting part 5 has, in its central part, an indentation 5b, through which the drive lug 32 can pass.

Moreover, in the example illustrated, and although this is not an indispensable improvement, a lumbar support portion consisting of a plate 53 is connected to the sliding plate 33 by means of a hinge joint 54. The plate 53 bears with its edge opposite the hinge 54 on the back 6 of the seat 1. In this way, the plate 53, which occupies that region 7 of the seat 1 which is located at the junction between the back 6 and the sitting part 5, is tilted to a greater or lesser extent according to the displacement of the sliding plate 33, thus modifying the angle formed between the said plate 53, which defines the lower region of the back 6, and the actual sitting part of the seat, formed by the sliding plate 33.

Of course, the various plates 33, 53 are, in actual fact, accommodated in suitable upholstery not illustrated in the figures.

The sliding of the sliding portion 33 from front to rear, bringing about the tilting of the plate 53, is obtained as follows.

When action is taken on the wheel 17 in order to drive the main screw 15 in rotation and, as seen above, cause a modification in the tilt of the bucket 2 in order, for example, to pass from the position illustrated in FIG. 1 to a position tilted to a greater extent, as illustrated in FIG. 3, the rotation thus imparted to the main screw 15 causes the auxiliary screw 26 to rotate in the other direction by means of the pinion 29 and the gearwheel 30. This results in a displacement of the nut 31 along the auxiliary screw 26 and therefore likewise in a displacement of the drive lug 32 and of the sliding portion 33. The sliding portion 33 is displaced parallel to the sitting part 5, in such a way that the curved end 33a of said sliding portion moves away from the front part 5a of the sitting part, thus increasing the overall dimensions of the sitting part of the bucket 2. At the same time, the opposite edge of the sliding portion 33, said edge comprising the hinge 54, is displaced and causes an increase in the tilt of the plate 53 so as to bring it to bear on the inner wall of the back 6, the plate 53 approaching the horizontal. It will be noted that, in order to obtain this result, it is sufficient, in the example illustrated, for the pitch of the main screw 15 and that of the auxiliary screw 26 to be in the same direction. A suitable reduction may be adopted by selecting the respective diameters of the pinion 29 and of the gearwheel 30 in such a way that, in the position tilted to the least extent, illustrated in FIG. 1, the sliding portion 33 practically coincides with the sitting part 5, the plate 53 substantially coinciding with the back 6, while, on the contrary, in the position tilted to the greatest extent, illustrated in FIG. 3, the sliding portion 33 projects at the maximum, so as to define the maximum dimension of the sitting part, with the plate 53 being close to the horizontal.

Thus, for each tilt of the bucket 2, a corresponding dimension of the sitting part and an optimum angle between the back and the sitting part are obtained automatically, ensuring maximum comfort for the child in each position.

In the example illustrated in the figures, the child seat 1 possesses, furthermore, variable-spacing armrests which thus make it possible to modify the effective width of the bucket 2, as desired.

Figure 4:
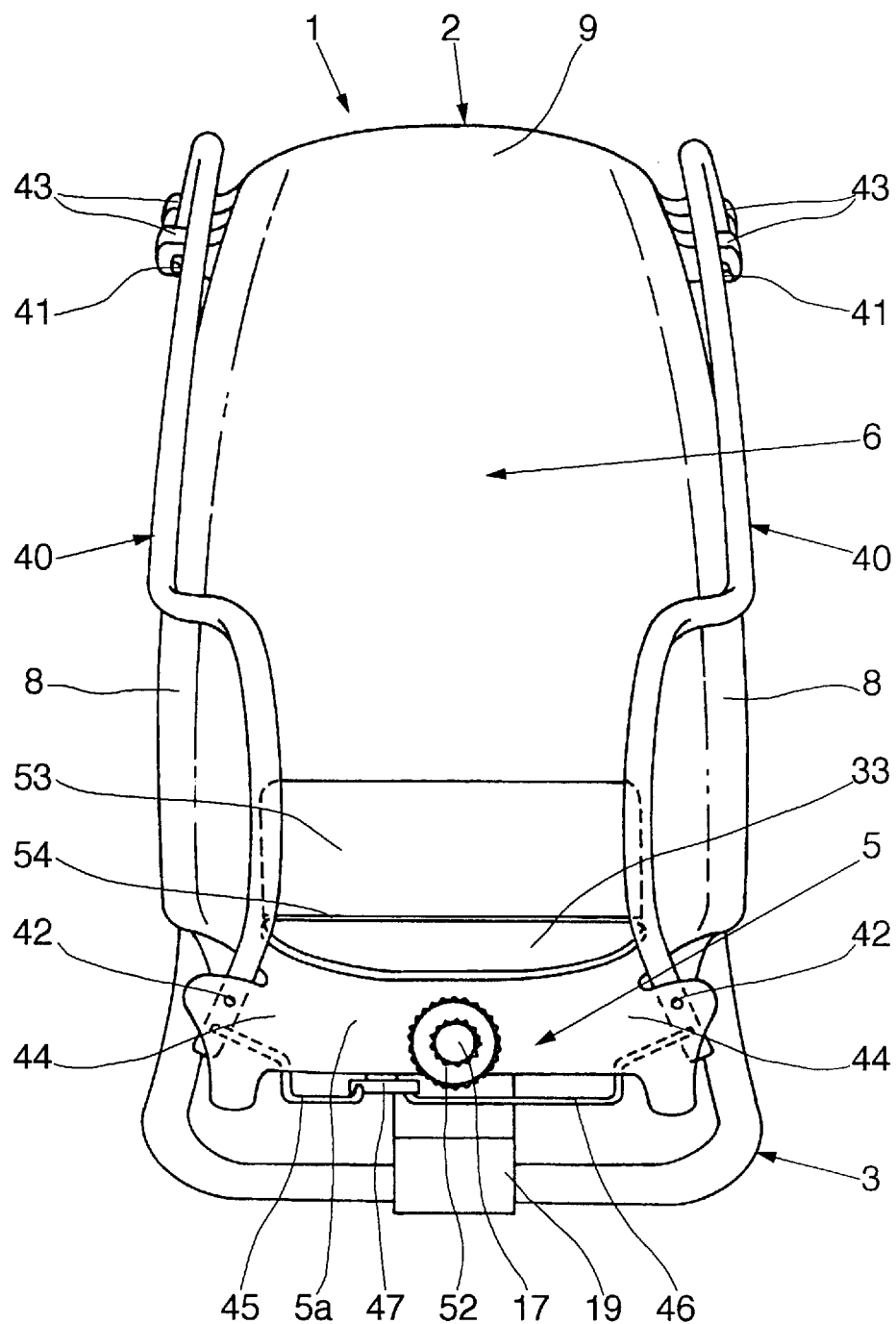
FIG. 4 is a front view of the seat in the preceding figures, showing the lateral armrests in the position in which they are closest to one another.
Figure 5:
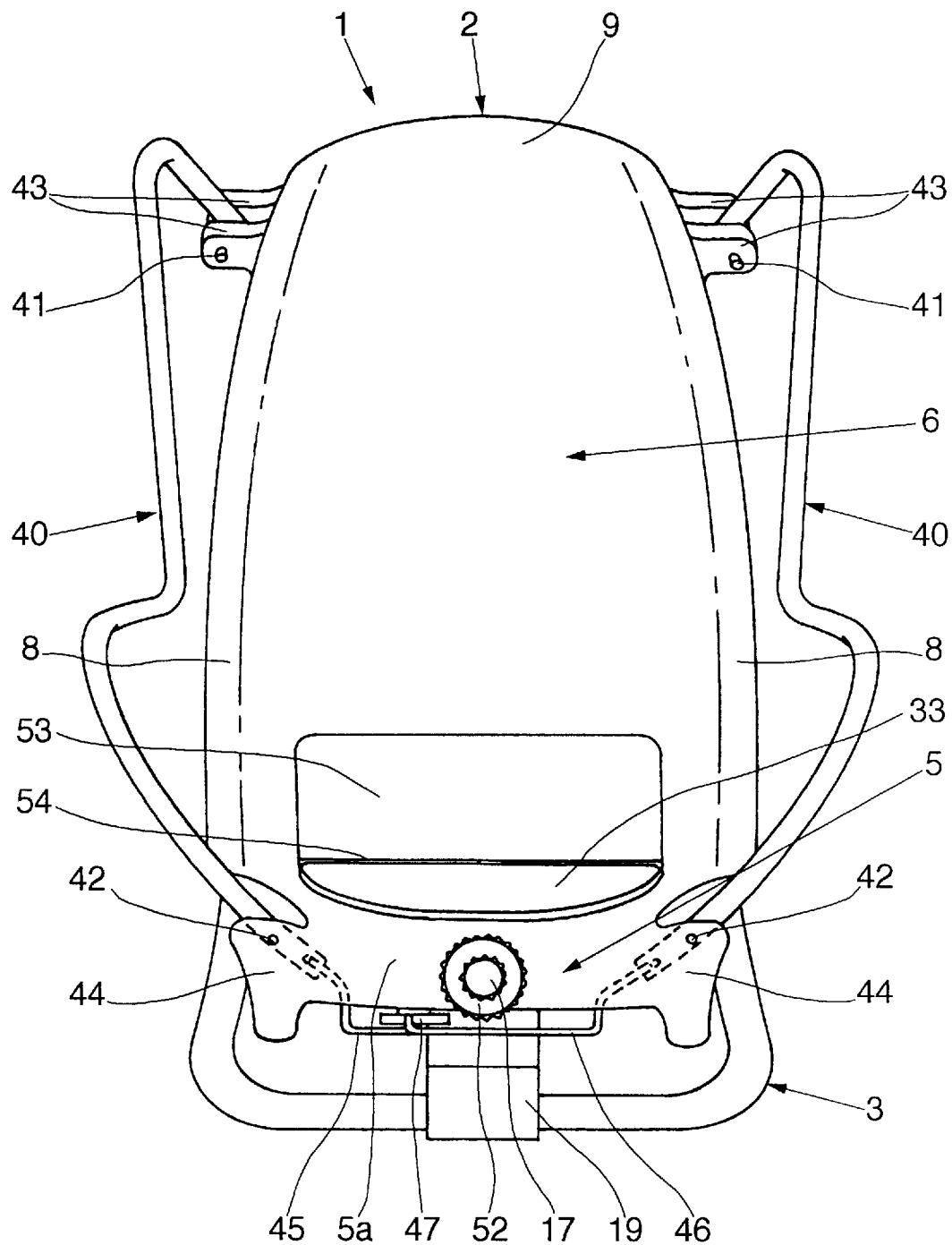
FIG. 5 is a view similar to that of FIG. 4, showing the lateral armrests in the position in which they are furthest away from one another.
Figure 6:
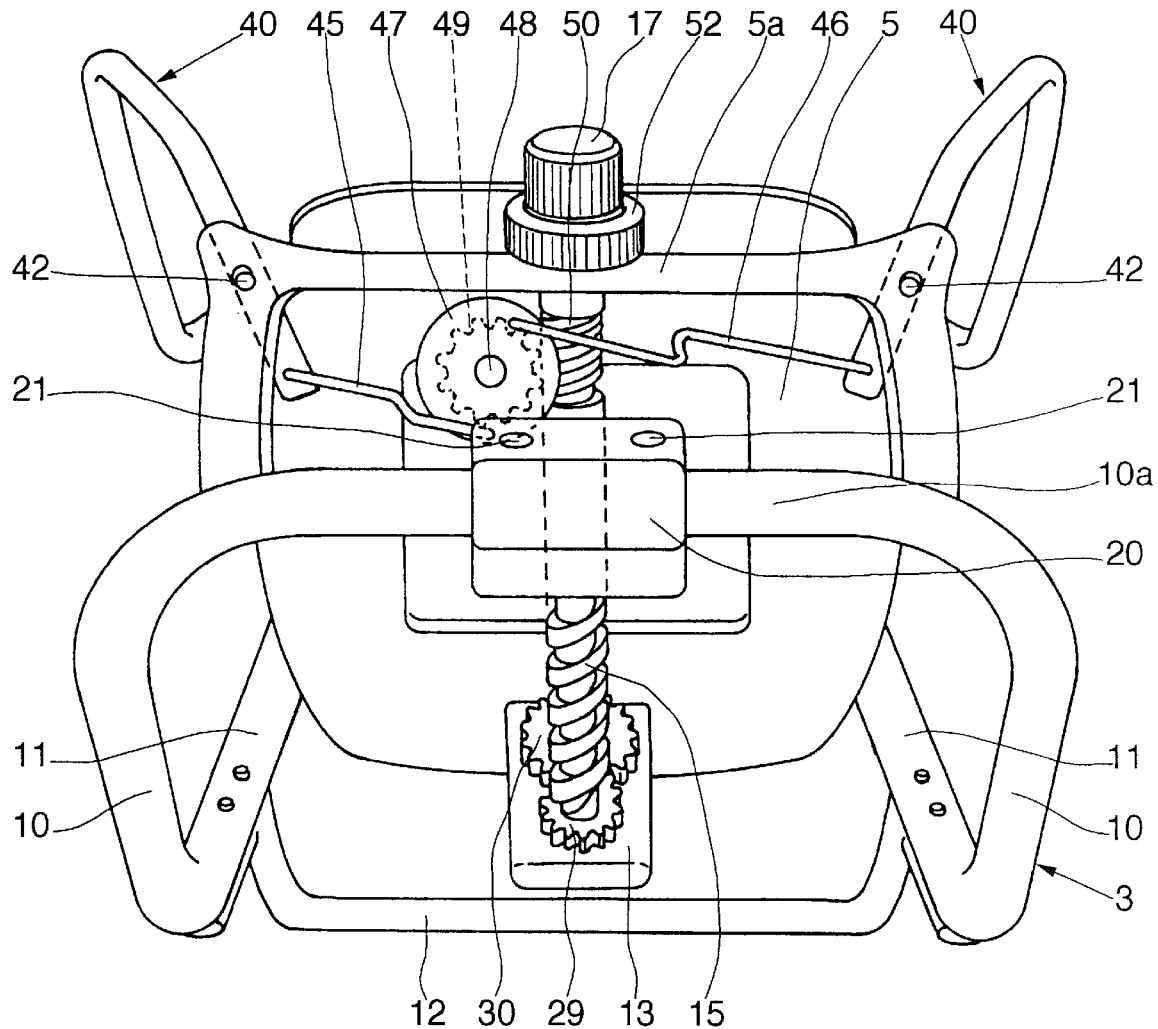
FIG. 6 is a bottom view showing, in particular, the mechanism for controlling the lateral armrests.

For this purpose, as illustrated in the figures, the child seat 1 comprise a lateral frame element 40 on each side of the bucket 2. In the example illustrated, each element 40 consists of a metal tube, the upper end of which is mounted rotatably on an upper axle 41 and the lower end of which is mounted rotatably on a lower axle 42 (FIGS. 4 and 6). The lower 42 and upper 41 axles are fastened to the bucket 2 made of molded plastic and, moreover, are arranged in a vertical plane, as seen, for example, in FIGS. 4 and 5. It will be noted that, in the example illustrated, the upper axles 41 are mounted on fastening lugs 43 molded integrally with the bucket 2. The same is true of the lower axles 42 mounted on fastening lugs 44 molded integrally with the bucket 2 in the vicinity of the front part 5a of the sitting part 5.

In the example illustrated, each lateral frame element 40 has an upper portion 40a equipped with a bend 40b which makes it possible to ensure that the child's head is well protected. Each lateral frame element 40 comprises, furthermore, a lower portion 40c close to the horizontal, which is continued in a substantially vertical bend 40d, the assembly as a whole performing the function of an armrest.

It will, of course, be appreciated that, in actual fact, suitable upholstery lines each of the lateral frame elements 40, thus forming, on each side of the bucket 2, lateral members which improve the protection and comfort of the child.

According to the invention, the two lateral frame elements 40 may be moved away from one another to a greater or lesser extent. They are pivoted simultaneously by means of two control rods 45 and 46 connected, at one of their ends, to the respective lower ends of the lateral frame elements 40 and, at their other end, to a rotary plate 47. The control rods 45 and 46 are fastened to the rotary plate 47 at substantially diametrically opposite points, as may be seen in FIG. 6.

Figure 2:
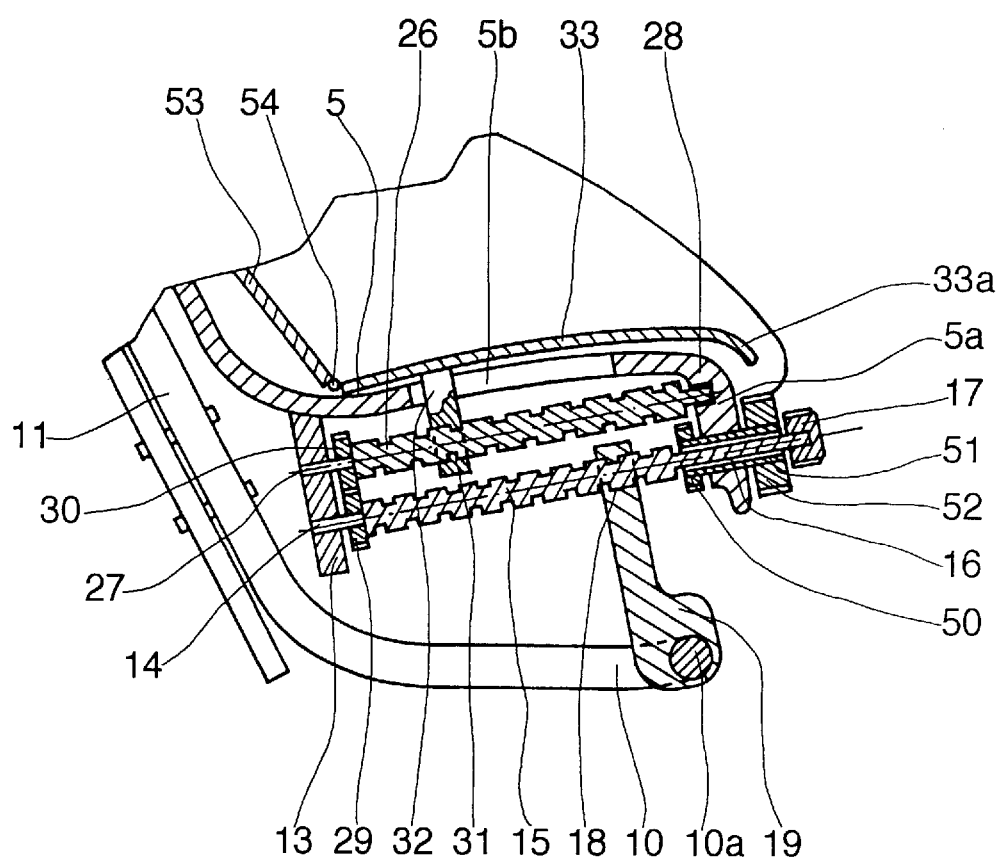
FIG. 2 is a sectional view of a detail taken from FIG. 1, showing part of the tilt control mechanism.
Figure 7:
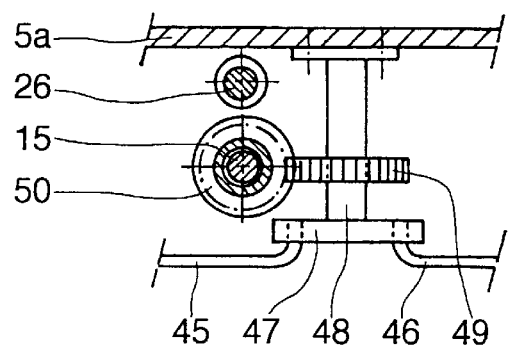
FIG. 7 is a detailed sectional view of the mechanism for controlling the armrests.

The plate 47 is mounted on a substantially vertical axle 48 fixed to the front 5a of the sitting part 5 (FIG. 7). The rotation of the plate 47 is caused by a pinion 49 likewise mounted on the axle 48 and meshing with a threaded screw portion 50 fixed to a hollow axle 51 coaxial relative to the main screw 15, as may be seen in FIG. 2. The hollow axle 51 passes through the passage 16 made in the front part 5a of the sitting part 5. A drivewheel 52 is arranged outside the front part 5a of the sitting part 5 and enables the user to drive the screw 50 and consequently the rotary plate 47 manually in rotation, thereby causing the two lateral frame elements to be moved away from or closer to one another. It will be noted, by looking at FIG. 6, that, due to the means for driving in rotation, which have just been described, and, in particular, to the axial arrangement of the screw 50 and of the drivewheel 52, the rotary plate 47 is offset relative to the vertical plane of symmetry of the seat 1 as a whole. The result of this is that the control rod 45 is shorter than the control rod 46, as may be seen in FIG. 6.

In the embodiment illustrated, the screw 50 is independent of the main screw 15, so that the synchronized and simultaneous actuation of the lateral frame elements 40 is independent of the actuation causing the bucket to tilt. It will be appreciated, nevertheless, that, by virtue of the arrangement of the various drive elements, it would, on the contrary, be easy to provide for the movement of the lateral frame elements 40 to take place at the same time as the variation in tilt of the bucket 2 and by the same control. It would be sufficient, in that case, for the two wheels 17 and 52 to be fixed relative to one another. The position in which the lateral frame elements 40 are closest to one another could correspond to the position tilted to the greatest extent, illustrated in FIG. 2, so as to ensure that the child is held better in a position close to the lying position. It would, on the contrary, likewise be conceivable to provide a maximum spacing of the lateral frame elements 40 for the position tilted to the greatest extent, illustrated in FIG. 2.

Although, in the example illustrated, the base is produced in the form of a metal reinforcement, it will be appreciated that a base made of molded plastic could likewise be used. The molded base in that case has suitable means for the pivoting mounting of the lug 19 carrying the nut 18 and for the retention of the seat by means of the slideways 23.

I claim:

1. A child seat to be used in an automotive vehicle comprising a bucket shaped element having a sitting part with upper and lower faces and a back part, with an inner and outer face, a base member adapted to be placed on and fastened to a seat of the automotive vehicle, and tilting control means mounted between said bucket shaped element and said base member, wherein said tilting control means comprise:

a main screw mounted for rotation in a first and a second bearing, both bearings being secured to the lower face of the sitting part of said bucket shaped element;

a main nut tiltably mounted on said base member and cooperating with said main screw;

at least one slideway integral with the outer face of said back part of the bucket shaped element;

a cross member secured to said base member and slideably received within said slideway.

2. The child seat according to claim 1, characterized in that the tilting control means comprises two slideways integral with the back part and cooperating with said cross-member of the base member.

3. The child seat according to claim 2, wherein the sitting part comprises a sliding portion, of which a displacement from front to rear is caused by the tilting control means, in such a way that a dimension of the sitting part is increased when the bucket shaped element is tilted to a greater extent.

4. The child seat according to claim 3, wherein an auxiliary screw/nut device is mounted under the sitting part, so as to drive the sliding portion of the sitting part.

5. A child seat to be used in an automotive vehicle comprising a bucket shaped element having a sitting part with upper and lower faces and a back part, a base member adapted to be placed on and fastened to a seat of the automotive vehicle, and tilting control means mounted between said bucket shaped element and said base member, wherein said tilting control means comprising:

a main screw mounted for rotation on the lower face of the sitting part of said bucket shaped element;

a main nut tiltably mounted on said base member and cooperating with said main screw;

sliding means mounted on said back part of the bucket shaped element and cooperating with retaining means secured to said base member;

said sitting part comprising an opening covered by a sliding portion, of which a displacement from front to rear is caused by said tilting control means; wherein said tilting control means further comprises:

an auxiliary screw mounted for rotation in first and second auxiliary bearings secured on the lower face of the sitting part, so that the auxiliary screw is substantially parallel to said main screw;

means for transmitting rotation of the main screw to the auxiliary screw;

and a nut element secured to said sliding portion, passing through said opening and cooperating with said auxiliary screw for displacement along the auxiliary screw.

6. The child seat according to claim 5, wherein a toothed pinion is mounted at an end of the main screw, so as to mesh with a gearwheel mounted at an end of the auxiliary screw.

7. The child seat according to claim 6, wherein the toothed pinion and the gearwheel are mounted close to bearings, which are fixed to the lower face of the sitting part.

8. The child seat according to any one of claims 4 to 7, wherein the auxiliary screw is mounted above the main screw between the main screw and the sitting part.

9. The child seat according to any one of claims 3 to 7, wherein a lumbar support portion is articulated on the sliding portion, so as to increase an angle between the sitting part and the back part during the displacement from front to rear of said sliding portion.

10. A child seat, to be used in an automotive vehicle comprising a bucket shaped element having a sitting part with upper and lower faces and a back part, a base member adapted to be placed on and fastened to a seat of the automotive vehicle, and two lateral frame elements pivotally mounted on either side of said bucket shaped element, so as to define two arm rests capable of moving from a first position where they are away from one another to a second position where they are closer to one another, and tilting control means mounted between said bucket shaped element and said base member, wherein said tilting control means comprises:

a main screw mounted for rotation on the lower face of the sitting part of said bucket shaped element;

a main nut tiltably mounted on said base member and cooperating with said main screw;

sliding means mounted on said back part of the bucket shaped element and cooperating with retaining means secured to said base member;

and an auxiliary control member actuatable independently from the rotation of said main screw for simultaneously pivoting said two lateral frame elements, said auxiliary control member being mounted on a front portion of said sitting part.

11. The child seat according to claim 10, wherein the auxiliary control member is mounted coaxially relative to the main screw and acts on a rotary plate connected to two control rods, which themselves in turn are connected to the two lateral frame elements.

12. The child seat according to claims 1, 5 or 10, wherein the base member is produced as a tubular metal reinforcement.

13. The child seat according to claims 1, 5 or 10, wherein the base member is produced from molded plastic.

* * * * *